(12) United States Patent
Pfister et al.

(10) Patent No.: US 7,860,281 B2
(45) Date of Patent: Dec. 28, 2010

(54) METHOD FOR THE AUTOMATIC RECOGNITION OF AN OBJECT IN AN IMAGE

(75) Inventors: Marcus Pfister, Bubenreuth (DE); Bernhard Sandkamp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 978 days.

(21) Appl. No.: 11/515,285

(22) Filed: Aug. 31, 2006

(65) Prior Publication Data
US 2007/0047769 A1 Mar. 1, 2007

(30) Foreign Application Priority Data
Sep. 1, 2005 (DE) .................. 10 2005 041 603

(51) Int. Cl.
*G06K 9/00* (2006.01)
(52) U.S. Cl. ...................... 382/128; 382/217
(58) Field of Classification Search ............... 382/100, 382/128, 130, 131, 132, 133, 134, 155, 156, 382/157, 158, 159, 160, 162, 165, 173, 181, 382/190, 224, 227; 600/300; 128/920, 922, 128/923, 924, 925; 706/10, 11, 12, 13, 14, 706/15, 16, 17, 18, 19, 20, 21, 25; 700/48, 700/49
See application file for complete search history.

(56) References Cited

U.S. PATENT DOCUMENTS

| | | | | |
|---|---|---|---|---|
| 4,175,860 A | * | 11/1979 | Bacus | ........................ 356/39 |
| 5,369,678 A | * | 11/1994 | Chiu et al. | ..................... 378/62 |
| 5,651,775 A | * | 7/1997 | Walker et al. | ................ 604/207 |
| 5,926,568 A | * | 7/1999 | Chaney et al. | .............. 382/217 |
| 6,091,852 A | * | 7/2000 | Entleitner et al. | ........... 382/181 |
| 2004/0062442 A1 | * | 4/2004 | Laumeyer et al. | ........... 382/190 |
| 2004/0136592 A1 | * | 7/2004 | Chen et al. | .................. 382/190 |
| 2004/0252870 A1 | * | 12/2004 | Reeves et al. | ............... 382/128 |
| 2006/0034500 A1 | * | 2/2006 | Quist et al. | ................. 382/130 |
| 2006/0173560 A1 | * | 8/2006 | Widrow | ....................... 700/48 |
| 2006/0265186 A1 | * | 11/2006 | Holland et al. | .............. 702/182 |
| 2009/0097721 A1 | * | 4/2009 | Kingsbury et al. | .......... 382/128 |

FOREIGN PATENT DOCUMENTS

| | | |
|---|---|---|
| DE | 100 05 835 A1 | 8/2001 |
| DE | 101 35 817 A1 | 2/2003 |
| DE | 103 40 544 A1 | 3/2005 |

OTHER PUBLICATIONS

M. Pfister, S. Behnke, R. Rojas; "Recognition of Handwritten Zip Codes in a Real-World Non-Standard-Letter Sorting System"; Journal.of Applied Intelligence, 2; 1998; pp. 1-24; Kluwer Academic Publishers; Boston, MA, USA.

* cited by examiner

*Primary Examiner*—Andrew W Johns
*Assistant Examiner*—Tahmina Ansari

(57) ABSTRACT

To enable a rapid and safe automatic recognition of the position of the catheter, particularly for an electrophysiological examination with an automatic control system of an electrode catheter, a two-stage image evaluation of an x-ray fluoroscopy image is provided. In the first analysis step, frequency polygons are herewith developed as potential locations of the catheter with the aid of structures contained in the image. In the second analysis step, only the previously identified potential catheter positions are investigated with the aid of a template method and the actual catheter position is identified.

7 Claims, 2 Drawing Sheets

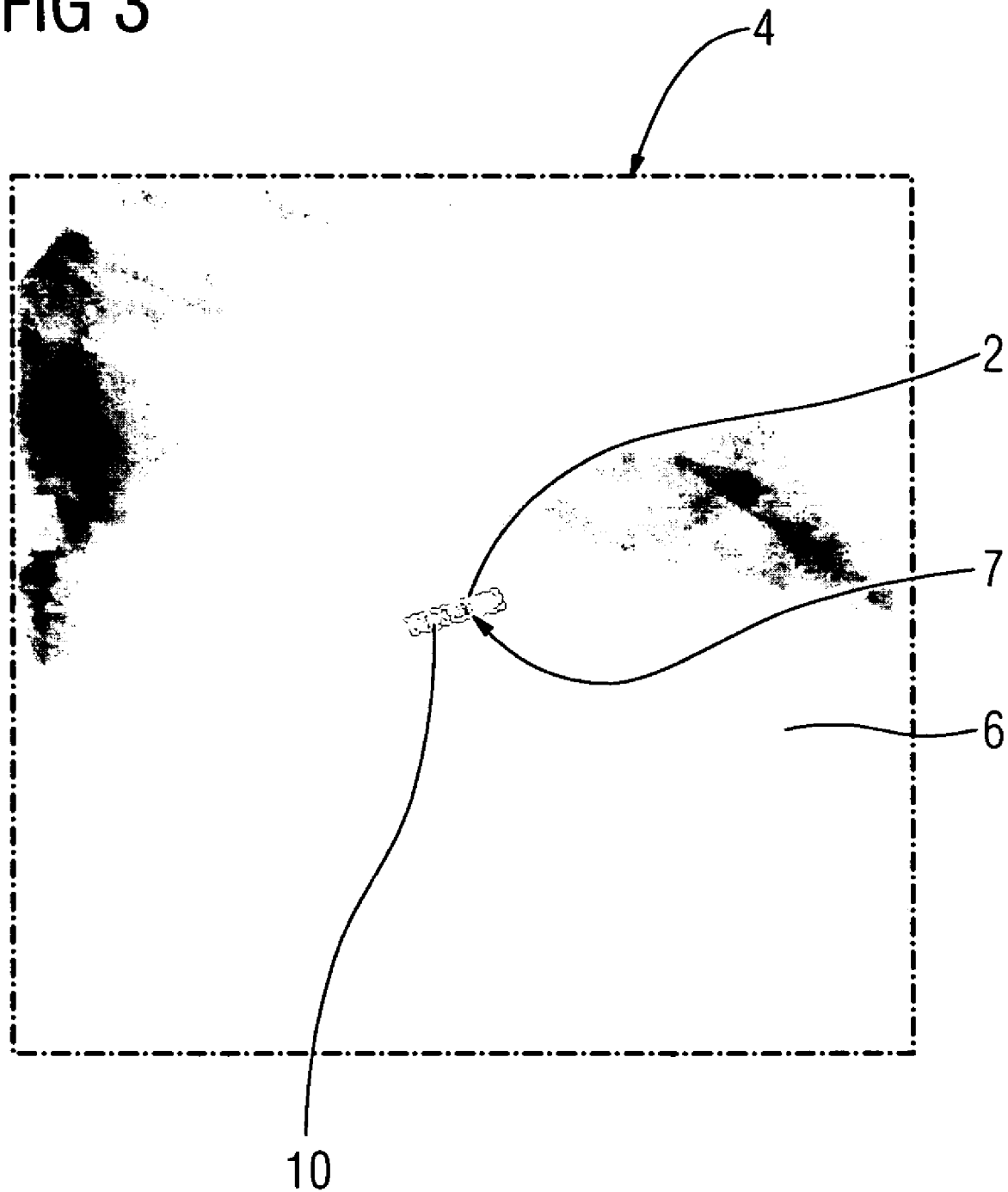

METHOD FOR THE AUTOMATIC RECOGNITION OF AN OBJECT IN AN IMAGE

CROSS REFERENCE TO RELATED APPLICATIONS

This application claims priority of German application No. 10 2005 041 603.9 filed Sep. 1, 2005, which is incorporated by reference herein in its entirety.

FIELD OF THE INVENTION

The invention relates to a method for the automatic recognition of an object in an image, in particular for recognizing a medical instrument, such as a catheter, in an image obtained by means of a medical imaging method.

BACKGROUND OF THE INVENTION

A position control of the inserted object is often necessary during the medical treatment or diagnosis, with which an instrument, in particular a catheter or also other medical treatment devices, are inserted into the patient. During a treatment of this type, images of the area to be examined and the inserted instrument are thus usually continuously produced in a parallel manner via an imaging system, for instance a computed tomography device, an angiography system or in the magnetic resonance device etc. With some applications, in particular with an electrophysiological examination, with which an electrode catheter is inserted into the heart, a high-precision active position control is required, i.e. not only a precise monitoring of the position of the catheter is required, so too is a high-precision control system of the catheter to the heart. Methods and systems which allow an automatic control system of the catheter are increasingly used for this purpose.

A precondition for an automatic control system of this type is a recognition of the current actual position of the catheter in the respective vascular structure. One option for determining the current actual position consists in the image evaluation of the images recorded using the imaging system. In other words, the reproduction of the instrument in the recorded image is automatically detected by corresponding image recognition software with the aid of an image processing system. One problem consists here, on the one hand, in ensuring that the actual position of the instrument is also detected. On the other hand, the problem consists that as rapid an identification as possible is needed in real time, in order to be able to determine the current actual position with an automatic control system during the continuous insertion of the instrument.

SUMMARY OF THE INVENTION

The object underlying the invention is to enable a safe and rapid automatic recognition of an object, in particular a medical instrument, in an image.

The object is achieved in accordance with the invention by a method according to the claims. It is subsequently provided for a selection of potential object locations in an image obtained by means of an imaging system to be determined with the aid of a first analysis method, and then with the aid of a second analysis method, only the selected potential object locations are subsequently investigated for the presence of the object.

An analysis method is generally understood here to involve a special method for image evaluation and for recognizing structures and patterns in an image. Methods for pattern and image recognition of this type are available in various forms. The use of two different analysis methods, in other words the use of differently configured algorithms for recognizing structures in the image, achieves the special advantage in that different analysis methods are combined with one another such that both a rapid and also a safe capture of the object in the image can be achieved. For this purpose, a preselection is made with the aid of the first analysis method. With the aid of the second, subsequent analysis method, only this preselection needs still to be monitored.

According to an expedient development, it is thus provided that the first analysis method exhibits a lower accuracy than the second analysis method. Accuracy is understood here to mean the degree of probability with which an identified object is the actually sought object, i.e. it is the degree of probability that a hit is present. As the first analysis method exhibits a lower accuracy, and thus essentially represents a rough method, a high margin of error is herewith deliberately allowed in the sense that a large number of objects are identified, in other words, a large number of "false" hits are determined. The advantage lies here in the fact that algorithms underlying a rough image evaluation of this type can be implemented very quickly and with very little computational effort. The preselected potential object locations can subsequently be investigated using the high-precision second analysis method, in order to ensure a clear identification of the object. As only some selected areas of the image and not the entire image must be investigated using the second analysis method, an extremely rapid and safe evaluation is possible despite the consecutively cycle of two image evaluation methods.

The first analysis method is herewith expediently adjusted in a tolerant manner so as to ensure that the potential object locations comprise the actual object location. A high number of "false" hits is thus deliberately allowed here in order to ensure that the actual object location is contained in the number of potential object locations, particularly also in the case of a poor image quality.

The degree of tolerance can preferably be adjusted here, in particular immediately on site by means of the medical personal. It is thus possible to be able to adjust the safety and accuracy requirements temporarily as a function of the respective current circumstances, such as image quality.

Frequency polygons, which are identified as potential object locations, are preferably developed with the first analysis method on the basis of the structures in the recorded image. The recorded image is thus only investigated for linear, interrelated structures and these are shown as potential object locations according to a type of frequency polygon. An analysis method of this type requires very little computational capacity and can thus be carried out very quickly. A comparable method of this type is for instance also used with the automatic handwriting recognition, in particular of handwritten addresses, such as can be inferred for instance from the article "Recognition of Handwritten ZIP Codes in a Real-World Non-Standard-Letter Sorting System", Journal of Applied Intelligence, Vol. 12, N. 1/2, January 2000, pp. 95-115, by M. Pfister, S. Behnke and R. Rojas.

According to an expedient further development, a comparison is made within the scope of the first analysis method between the discovered frequency polygons and an object frequency polygon provided and assigned to the object, with the locations of said developed frequency polygons bearing a resemblance to the object frequency polygon being identified as potential object locations. A supplementary preselection and restriction of the possible object locations thus hereby takes place in order to restrict the number of image areas to subsequently be investigated using the second analysis method.

A so-called template method or mapping method is expediently used as a second analysis method. With a method of this type, a predefined image model of the object, in other words a computer-based template, is compared with the image areas of the previously determined potential object locations. A template-based method of this type is described for instance in the article "Ein modellbasierter Ansatz zur Lokalisation von Basket-Kathetern für endokardiales Mapping", ["A model-based approach to the localization of basket catheters for endocardial mapping"] in Biomedizinische Technik, Volume 45-1, pages 57 and 58, September 2000 by Ingo H. de Boer, F. B. Sachse, Olaf Dössel.

This template-based method is a high-precision method and enables a safe identification of the object in the image.

The actual object location is expediently determined continuously and in real time, i.e. the two analysis methods are continuously carried out in parallel to the generation of images by means of the imaging system.

The information about the actual object location is preferably used for an automatic navigation of the object. The automatic detection of the object location with the method introduced here is thus used particularly for an automatic control system of an instrument, in particular an electrode catheter for an electrophysiological examination.

BRIEF DESCRIPTION OF THE DRAWINGS

An exemplary embodiment of the invention is described in more detail below with reference to the drawings, in which:

FIG. 3 shows a simplified representation of the fluoroscopy image according to FIG. 1, with an image model of the catheter for identifying the actual catheter position being laid over the image, with the aid of the second analysis method.

Accordingly, identical features are provided with the same reference characters in the figures.

DETAILED DESCRIPTION OF THE INVENTION

Figure 1:
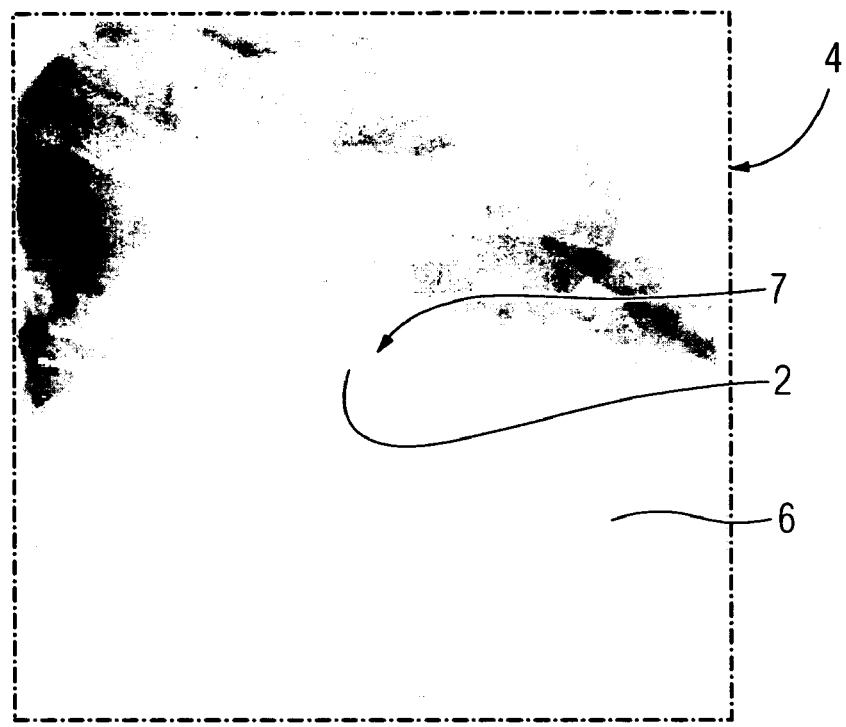
FIG. 1 shows a simplified representation of an x-ray fluoroscopy image of an area to be examined, in which a catheter for an electrophysiological examination is inserted.

With the treatment of a patient, in particular during an electrophysiological examination, an electrode catheter 2, in other words a catheter equipped with electrodes, is inserted into the patient and moved little by little towards the heart. Fluoroscopy images 4 are continuously generated in parallel during the examination via a medical imaging system, for instance using an x-ray computed tomography system. A fluoroscopy image 4 of this type is shown in FIG. 1. An automatic acquisition of the position of the catheter 2 within the image 4 and thus within the region 6 or the tissue to be examined and illustrated in image 4 is carried out with the aid of the method described here.

The catheter 2 is automatically controlled (not described in this manner in further detail), in other words both the insertion movement in the longitudinal direction of the catheter 2 and also its orientation in the x-y level extending perpendicularly to the longitudinal direction are carried out in a controlled manner using a suitable remote controller. Alternatively to this, only the orientation in the x-y level of the catheter tip is controlled remotely and the insertion in the insertion direction is carried out manually. In principle, it is also possible to control the catheter in all three spatial directions, in addition to the insertion movement. Magnetic systems are used for the control system for instance.

The data obtained using the method described here, in particular coordinates of the actual position of the catheter 2, is transferred to a control and computing unit, which, on the basis of this data, undertakes the advanced automatic control system of the catheter 2 up to the point of its desired target area, in particular the heart. One precondition for enabling an automatic control system of this type is for the data about the actual position 7 of the catheter 2 during its insertion to be provided in real time. A very rapid position acquisition of the catheter 2 is thus required. To rule out any tissue damage, a very high degree of safety is simultaneously required when the current position is determined.

Figure 2:
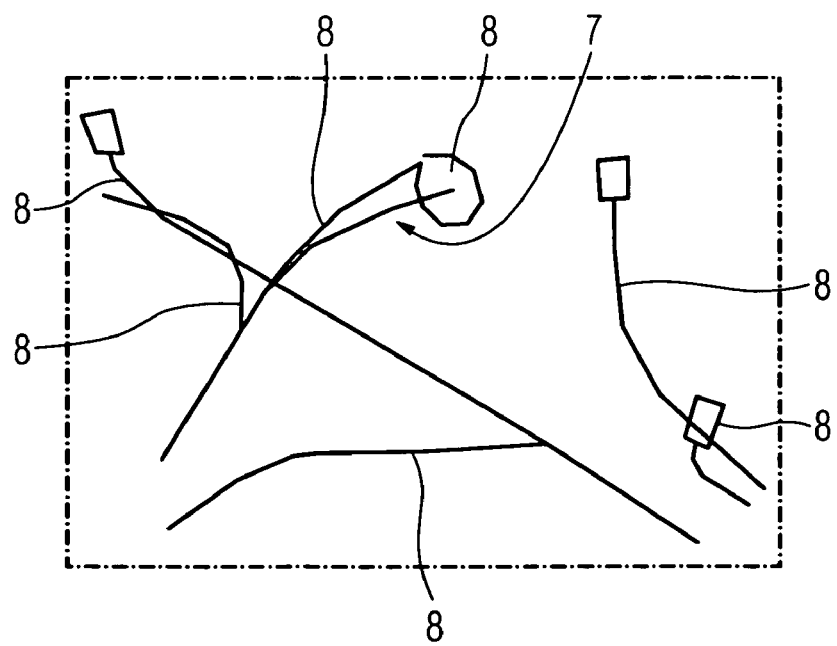
FIG. 2 shows a simplified representation of frequency polygons developed from the fluoroscopy image according to FIG. 1 with the aid of the first analysis method

To enable both a rapid and also a safe determination of the actual position, provision is made in accordance with the invention for a two-stage process. With the aid of a first rapid and rough analysis method, frequency polygons 8 illustrating the potential locations for the electrode catheter 2 are initially determined from the image 4 on the basis of the structures contained therein. The frequency polygons 8 obtained according to this first analysis step are shown in FIG. 2.

In the second analysis step following henceforth, only the image areas identified by the frequency polygons are still investigated with the aid of a template method. For this purpose, an image model 10 (Template), in other words a type of template of the catheter, is laid over the image 4 in a manner known per se, and namely only over the potential locations defined by the frequency polygons 8. As the template method is a high-precision method, a safe and reliable locating of the actual position of the catheter 2 is hereby carried out. The result of this second analysis method with the template method is shown in FIG. 3. The actual position of the catheter 2 is detected quickly and reliably despite the two-stage process.

The invention claimed is:

1. A method for automatically recognizing an object in an image obtained by a medical imaging method, comprising:

determining with a processor a plurality of potential object locations located over an entire area of the image, wherein the determining of the plurality of potential object locations is based on a first analysis method for image evaluation and for recognition of respective structures and patterns at the plurality of potential object locations; and investigating with the processor the plurality of potential object locations for identifying an actual object location, wherein the investigating of the plurality of potential object locations is based on a second analysis method for image evaluation and for recognition of structures and patterns at selected areas of the image, wherein the selected areas of the image being evaluated by the second analysis method correspond to the plurality of potential object locations determined by the first analysis method, wherein the first analysis method has an image evaluation accuracy corresponding to a degree of probability that structures and patterns recognized by the first analysis method at the plurality of potential object locations actually correspond to the object;

determining with the first analysis method a plurality of frequency polygons indicative of the plurality of potential object locations;

comparing each of the plurality of frequency polygons relative to a predetermined frequency polygon assigned to the object;

selecting frequency polygons which have a resemblance to the predetermined object frequency polygon as likely potential object locations;

wherein the second analysis method has an image evaluation accuracy corresponding to a degree of probability that structures and patterns recognized by the second analysis method at the plurality of potential object locations actually correspond to the object, wherein the second analysis method involves a template or map of the object;

laying the template or map of the object over the potential object locations in the image;

comparing the template or map of the object relative to the frequency polygons corresponding the potential object location;

based on the results of the comparing of the template or the map relative to the frequency polygons, selecting one location likely to correspond to the actual location of the object;

wherein the degree of probability of the second analysis method is higher relative to the degree of probability of the first analysis method, and wherein the image evaluation accuracy of the first analysis method is adjustable by a user to adjust a number of the plurality of frequency polygons being determined by the first analysis method.

2. The method as claimed in claim 1, wherein the actual object location is determined continuously in parallel to a generation of the image.

3. The method as claimed in claim 2, wherein the actual object location is used for an automatic navigation of the object.

4. The method as claimed in claim 1, wherein the object is a medical instrument.

5. The method as claimed in claim 4, wherein the medical instrument is a catheter.

6. A computer for automatically recognizing an object in an image obtained by a medical imaging method, comprising:

a monitor that displays the image; and a central processing unit that:

determines a plurality of potential object locations located over an entire area of the image, wherein the determining of the plurality of potential object locations is based on a first analysis method for image evaluation and for recognition of respective structures and patterns at the plurality of potential object locations;

investigates the plurality of potential object locations for identifying an actual object location, wherein the investigating of the plurality of potential object locations is based on a second analysis method for image evaluation and for recognition of structures and patterns at selected areas of the image, wherein the selected areas of the image being evaluated by the second analysis method correspond to the plurality of potential object locations determined by the first analysis method, wherein the first analysis method has an image evaluation accuracy corresponding to a degree of probability that structures and patterns recognized by the first analysis method at the plurality of potential object locations actually correspond to the object;

determines with the first analysis method a plurality of frequency polygons;

compares each of the plurality of frequency polygons relative to a predetermined frequency polygon assigned to the object;

selects frequency polygons which have a resemblance to the predetermined object frequency polygon as potential object locations;

wherein the second analysis method has an image evaluation accuracy corresponding to a degree of probability that structures and patterns recognized by the second analysis method at the plurality of potential object locations actually correspond to the object, wherein the second analysis method involves a template or map of the object;

lays the template or map of the object over the potential object locations in the image;

compares the template or map of the object relative to the frequency polygons corresponding the potential object locations;

based on the results of the comparison of the template or map relative to the frequency polygons, selects one location likely to correspond to the actual location of the object;

wherein the degree of probability of the second analysis method is higher relative to the degree of probability of the first analysis method, and wherein the image evaluation accuracy of the first analysis method is adjustable by a user to adjust a number of the plurality of frequency polygons being determined by the first analysis method.

7. The computer as claimed in claim 6, wherein the central processing unit comprises a software which executes the determining and investigating steps.

* * * * *